(12) United States Patent
Papasakellariou et al.

(10) Patent No.: US 10,225,060 B2
(45) Date of Patent: *Mar. 5, 2019

(54) APPARATUS AND METHOD FOR ALLOCATING CODE RESOURCES TO UPLINK ACK/NACK CHANNELS IN A CELLULAR WIRELESS COMMUNICATION SYSTEM

(71) Applicant: Samsung Electronics Co., Ltd., Gyeonggi-do (KR)

(72) Inventors: Aris Papasakellariou, Houston, TX (US); Joon-Young Cho, Gyeonggi-do (KR); Jianzhong Zhang, Plano Collin County, TX (US); Zhouyue Pi, Allen, TX (US); Ju-Ho Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,172

(22) Filed: Jun. 28, 2016

(65) Prior Publication Data
US 2016/0308655 A1 Oct. 20, 2016

Related U.S. Application Data

(63) Continuation of application No. 14/182,780, filed on Feb. 18, 2014, now Pat. No. 9,379,869, which is a
(Continued)

(30) Foreign Application Priority Data

Aug. 10, 2007 (KR) .............................. 10-2007-80943
Aug. 14, 2007 (KR) .............................. 10-2007-82030
(Continued)

(51) Int. Cl.
*H04L 5/00* (2006.01)
*H04L 1/16* (2006.01)
(Continued)

(52) U.S. Cl.
CPC ......... *H04L 5/0055* (2013.01); *H04B 1/7097* (2013.01); *H04J 11/005* (2013.01);
(Continued)

(58) Field of Classification Search
CPC .. H04L 5/0055; H04J 11/005; H04W 72/0406
See application file for complete search history.

(56) References Cited

U.S. PATENT DOCUMENTS 5,432,814 A 7/1995 Hasegawa
8,295,389 B2 10/2012 Han et al.
(Continued)

FOREIGN PATENT DOCUMENTS

CN 1540872 A 10/2004
CN 1750450 A 3/2006
(Continued)

OTHER PUBLICATIONS

Original R1-062742; NTT DoCoMo, et al.; "CDMA-Based Multiplexing Method for Multiple ACK/NACK and CQI in E-UTRA Uplink;" 3 GPP TSG RAN WG1 Meeting #48bls; Mar. 2007; http://www.3gpp.org/ftp/tsg_ran/WG1_RL1/TSGR1_48b/Docs/R1-071649.zip.
(Continued)

*Primary Examiner* — Rhonda L Murphy
(74) *Attorney, Agent, or Firm* — Cha & Reiter, LLC.

(57) ABSTRACT

A method and apparatus are provided for allocating code resources to ACK/NACK channel indexes, when UEs need ACK/NACK transmission in a wireless communication system in which a predetermined number of orthogonal cover Walsh codes is selected from among available orthogonal
(Continued)

cover Walsh codes, at least one subset is formed, having the selected orthogonal cover Walsh codes arranged in an ascending order of cross interference, subsets are selected for use in first and second slots of a subframe, and the orthogonal cover Walsh codes of the subset selected for each slot and ZC sequence cyclic shift values are allocated to the ACK/NACK channel indexes.

20 Claims, 20 Drawing Sheets

Related U.S. Application Data continuation of application No. 13/657,148, filed on Oct. 22, 2012, now Pat. No. 8,670,297, which is a continuation of application No. 12/189,410, filed on Aug. 11, 2008, now Pat. No. 8,295,155.

(30) Foreign Application Priority Data

| Sep. 6, 2007 | (KR) | ............................ 10-2007-90688 |
| Sep. 19, 2007 | (KR) | ............................ 10-2007-95265 |
| Jan. 29, 2008 | (KR) | ............................ 10-2008-9291 |

(51) Int. Cl.

| H04L 1/18 | (2006.01) |
| H04B 1/7097 | (2011.01) |
| H04J 11/00 | (2006.01) |
| H04J 13/18 | (2011.01) |
| H04W 72/04 | (2009.01) |
| H04L 27/26 | (2006.01) |
| H04J 13/00 | (2011.01) |
| H04L 1/00 | (2006.01) |
| H04W 72/02 | (2009.01) |
| H04W 84/04 | (2009.01) |

(52) U.S. Cl.
CPC ............ *H04J 13/18* (2013.01); *H04L 1/1607* (2013.01); *H04L 1/1861* (2013.01); *H04L 5/0053* (2013.01); *H04L 27/2607* (2013.01); *H04W 72/0406* (2013.01); *H04B 2201/709709* (2013.01); *H04J 13/0048* (2013.01); *H04J 13/0062* (2013.01); *H04L 1/0026* (2013.01); *H04L 5/0016* (2013.01); *H04L 5/0019* (2013.01); *H04W 72/02* (2013.01); *H04W 72/0466* (2013.01); *H04W 84/042* (2013.01)

(56) References Cited

U.S. PATENT DOCUMENTS

| 2003/0063583 | A1 | 4/2003 | Padovani et al. |
| 2006/0034240 | A1 | 2/2006 | Kwak et al. |
| 2006/0140154 | A1 | 6/2006 | Kwak et al. |
| 2008/0316957 | A1* | 12/2008 | Shen ........................ H04J 13/00 370/328 |
| 2009/0073955 | A1* | 3/2009 | Malladi ................ H04L 5/0051 370/349 |
| 2010/0103899 | A1 | 4/2010 | Kwak et al. |
| 2012/0201275 | A1* | 8/2012 | Tiirola ................ H04J 13/0062 375/135 |

FOREIGN PATENT DOCUMENTS

| CN | 1918820 A | 2/2007 |
| JP | 6-350562 A | 12/1994 |
| JP | 11-145933 A | 5/1999 |
| KR | 10-2005-0118062 A | 12/2005 |
| WO | 2005/112486 A2 | 11/2005 |
| WO | 2009/120843 A2 | 10/2009 |

OTHER PUBLICATIONS

"Formula for Restricted Cyclic shift Set"; 3GPP TSG RAN WG1 Meeting #49; May 7-11, 2007; LG Electronics; Kobe, Japan; R1-072331.

"Specification of restricted set of cyclic shifts of root Zadoff-Chu sequences"; TSG RAN WG1 Meeting #49; May 7-11, 2007; Huawei, Panasonic; Kobe, Japan; R1-072324.

Texas Instruments; "Coherent Uplink ACK/NACK Transmission with High Speed UEs;" 3GPP TSG RAN WG1#49; Jun. 25-29, 2007; R1-072857.

Panasonic; "Usage of Cyclic Shifts and Block-Wise Spreading Codes for Uplink ACK/NACK;" 3GPP TSG RAN WG1 Meeting #49bis; Jun. 25-29, 2007; R1-072799.

\* cited by examiner

|  | Best | 2$^{nd}$ Best | Worst |
|---|---|---|---|
|  | Code A | Code B | Code C |
| Subset 0<br>W0, W1, W2 | W1 | W2 | W0 |
| Subset 1<br>W0, W1, W3 | W0 | W3 | W1 |
| Subset 2<br>W0, W2, W3 | W3 | W0 | W2 |
| Subset 3<br>W1, W2, W3 | W2 | W1 | W3 |

FIG. 5b

| Cyclic shift value | Walsh code in the 1st slot (604) | | | Walsh code in the 2nd slot (605) | | |
|---|---|---|---|---|---|---|
| | A of Subset i (601) | C of Subset i (602) | B of Subset i | B of Subset i | C of Subset i (607) | A of Subset i (608) |
| 0 (610) | ACK/NACK #0 (630) | | #12 (631) | #0 | | #12 |
| 1 (611) | | #6 | | | #6 | |
| 2 (612) | #1 | | #13 | #1 | | #13 |
| 3 (613) | | #7 | | | #7 | |
| 4 (614) | #2 | | #14 | #2 | | #14 |
| 5 (615) | | #8 | | | #8 | |
| 6 (616) | #3 | | #15 | #3 | | #15 |
| 7 (617) | | #9 | | | #9 | |
| 8 (618) | #4 | | #16 | #4 | | #16 |
| 9 (619) | | #10 | | | #10 | |
| 10 (620) | #5 | | #17 | #5 | | #17 |
| 11 (621) | | #11 | | | #11 | |

FIG.6

| Cyclic shift value | Walsh code in the 1st slot (704) | | | Walsh code in the 2nd slot (705) | | |
|---|---|---|---|---|---|---|
| | A of Subset i | C of Subset j | B of Subset i | C of Subset i | B of Subset i | A of Subset i |
| 0 | ACK/NACK #0 (706) | | #12 (707) | #0 (708) | | #12 (709) |
| 1 | | #6 (710) | | | #6 (711) | |
| 2 | #1 | | #13 | #1 | | #13 |
| 3 | | #7 | | | #7 | |
| 4 | #2 | | #14 | #2 | | #14 |
| 5 | | #8 | | | #8 | |
| 6 | #3 | | #15 | #3 | | #15 |
| 7 | | #9 | | | #9 | |
| 8 | #4 | | #16 | #4 | | #16 |
| 9 | | #10 | | | #10 | |
| 10 | #5 | | #17 | #5 | | #17 |
| 11 | | #11 | | | #11 | |

FIG.7

|  | Walsh code in the 1st slot ||| Walsh code in the 2nd slot |||
|---|---|---|---|---|---|---|
| Cyclic shift value | A of Subset i | C of Subset i | B of Subset i | B of Subset k | C of Subset k | A of Subset k |
| 0 | ACK/NACK #0 |  | #12 | #0 |  | #12 |
| 1 |  | #6 |  |  | #6 |  |
| 2 | #1 |  | #13 | #1 |  | #13 |
| 3 |  | #7 |  |  | #7 |  |
| 4 | #2 |  | #14 | #2 |  | #14 |
| 5 |  | #8 |  |  | #8 |  |
| 6 | #3 |  | #15 | #3 |  | #15 |
| 7 |  | #9 |  |  | #9 |  |
| 8 | #4 |  | #16 | #4 |  | #16 |
| 9 |  | #10 |  |  | #10 |  |
| 10 | #5 |  | #17 | #5 |  | #17 |
| 11 |  | #11 |  |  | #11 |  |

FIG.8

| Cyclic shift value | Walsh code in the 1st slot | | | Walsh code in the 2nd slot | | |
| --- | --- | --- | --- | --- | --- | --- |
| | A of Subset i | C of Subset i | B of Subset i | C of Subset k | B of Subset k | A of Subset k |
| 0 | ACK/NACK #0 | | #12 | #0 | | #12 |
| 1 | | #6 | | | #6 | |
| 2 | #1 | | #13 | #1 | | #13 |
| 3 | | #7 | | | #7 | |
| 4 | #2 | | #14 | #2 | | #14 |
| 5 | | #8 | | | #8 | |
| 6 | #3 | | #15 | #3 | | #15 |
| 7 | | #9 | | | #9 | |
| 8 | #4 | | #16 | #4 | | #16 |
| 9 | | #10 | | | #10 | |
| 10 | #5 | | #17 | #5 | | #17 |
| 11 | | #11 | | | #11 | |

FIG.9

|  | Walsh code in the 1st slot | | | Walsh code in the 2nd slot | | |
| --- | --- | --- | --- | --- | --- | --- |
| Cyclic shift value | A of Subset i | C of Subset i | B of Subset i | A of Subset k | C of Subset k | B of Subset k |
| 0 | ACK/NACK #0 |  | #12 | #0 |  | #12 |
| 1 |  | #6 |  |  | #6 |  |
| 2 | #1 |  | #13 | #1 |  | #13 |
| 3 |  | #7 |  |  | #7 |  |
| 4 | #2 |  | #14 | #2 |  | #14 |
| 5 |  | #8 |  |  | #8 |  |
| 6 | #3 |  | #15 | #3 |  | #15 |
| 7 |  | #9 |  |  | #9 |  |
| 8 | #4 |  | #16 | #4 |  | #16 |
| 9 |  | #10 |  |  | #10 |  |
| 10 | #5 |  | #17 | #5 |  | #17 |
| 11 |  | #11 |  |  | #11 |  |

FIG.10

|  | Walsh code in the 1st slot | | | Walsh code in the 2nd slot | | |
| --- | --- | --- | --- | --- | --- | --- |
| Cyclic shift value | A of Subset i | C of Subset i | B of Subset i | B of Subset k | C of Subset k | A of Subset k |
| 0 | ACK/NACK #0 |  | #12 | #1 |  | #15 |
| 1 |  | #6 |  |  | #10 |  |
| 2 | #1 |  | #13 | #3 |  | #17 |
| 3 |  | #7 |  |  | #7 |  |
| 4 | #2 |  | #14 | #5 |  | #12 |
| 5 |  | #8 |  |  | #9 |  |
| 6 | #3 |  | #15 | #0 |  | #14 |
| 7 |  | #9 |  |  | #11 |  |
| 8 | #4 |  | #16 | #2 |  | #16 |
| 9 |  | #10 |  |  | #6 |  |
| 10 | #5 |  | #17 | #4 |  | #13 |
| 11 |  | #11 |  |  | #8 |  |

FIG.11

|  | Walsh code in the 1st slot | | | Walsh code in the 2nd slot | | |
|---|---|---|---|---|---|---|
| Cyclic shift value | A of Subset i | C of Subset i | B of Subset i | A of Subset k | C of Subset k | B of Subset k |
| 0 | ACK/NACK #0 |  | #12 | #12 |  | #6 |
| 1 |  | #6 |  |  | #0 |  |
| 2 | #1 |  | #13 | #13 |  | #7 |
| 3 |  | #7 |  |  | #1 |  |
| 4 | #2 |  | #14 | #14 |  | #8 |
| 5 |  | #8 |  |  | #2 |  |
| 6 | #3 |  | #15 | #15 |  | #9 |
| 7 |  | #9 |  |  | #3 |  |
| 8 | #4 |  | #16 | #16 |  | #10 |
| 9 |  | #10 |  |  | #4 |  |
| 10 | #5 |  | #17 | #17 |  | #11 |
| 11 |  | #11 |  |  | #5 |  |

FIG.12

| Cyclic shift value | Walsh code in the 1st slot | | | Walsh code in the 2nd slot | | |
|---|---|---|---|---|---|---|
| | A of Subset i | C of Subset i | B of Subset i | A of Subset k | C of Subset k | B of Subset k |
| 0 | ACK/NACK #0 | | #12 | #10 | | #1 |
| 1 | | #6 | | | #15 | |
| 2 | #1 | | #13 | #7 | | #3 |
| 3 | | #7 | | | #17 | |
| 4 | #2 | | #14 | #9 | | #5 |
| 5 | | #8 | | | #12 | |
| 6 | #3 | | #15 | #11 | | #0 |
| 7 | | #9 | | | #14 | |
| 8 | #4 | | #16 | #6 | | #2 |
| 9 | | #10 | | | #16 | |
| 10 | #5 | | #17 | #8 | | #4 |
| 11 | | #11 | | | #13 | |

FIG.13

| Cyclic shift value | Walsh code in the 1st slot | | | Walsh code in the 2nd slot | | |
|---|---|---|---|---|---|---|
| | A of Subset i | C of Subset i | B of Subset i | A of Subset k | C of Subset k | B of Subset k |
| 0 | ACK/NACK #0 | | #12 | #4 | | #14 |
| 1 | | #6 | | | #3 | |
| 2 | #1 | | #13 | #9 | | #6 |
| 3 | | #7 | | | #7 | |
| 4 | #2 | | #14 | #1 | | #8 |
| 5 | | #8 | | | #17 | |
| 6 | #3 | | #15 | #13 | | #0 |
| 7 | | #9 | | | #11 | |
| 8 | #4 | | #16 | #15 | | #10 |
| 9 | | #10 | | | #16 | |
| 10 | #5 | | #17 | #2 | | #12 |
| 11 | | #11 | | | #5 | |

FIG.14

APPARATUS AND METHOD FOR ALLOCATING CODE RESOURCES TO UPLINK ACK/NACK CHANNELS IN A CELLULAR WIRELESS COMMUNICATION SYSTEM

CROSS REFERENCE TO RELATED APPLICATIONS

This application is a Continuation of U.S. patent application Ser. No. 14/182,780 filed on Feb. 18, 2014 and assigned U.S. Pat. No. 9,379,869 issued on Jun. 28, 2016 which claims the benefit of the earlier U.S. patent application Ser. No. 13/657,148 filed on Oct. 22, 2012 and assigned U.S. Pat. No. 8,670,297 issued on Mar. 11, 2014 which in turn claims a priority to an earlier U.S. patent application Ser. No. 12/189,410 filed on Aug. 11, 2008 and assigned U.S. Pat. No. 8,295,155 issued on Oct. 23, 2012 and claims the benefit under 35 U.S.C. § 119(a) of a Korean Patent Application filed in the Korean Intellectual Property Office on Aug. 10, 2007 and assigned Serial No. 10-2007-80943, a Korean Patent Application filed in the Korean Intellectual Property Office on Aug. 14, 2007 and assigned Serial No. 10-2007-82030, a Korean Patent Application filed in the Korean Intellectual Property Office on Sep. 6, 2007 and assigned Serial No. 10-2007-90688, a Korean Patent Application filed in the Korean Intellectual Property Office on Sep. 19, 2007 and assigned Serial No. 10-2007-95265, and a Korean Patent Application filed in the Korean Intellectual Property Office on Jan. 29, 2008 and assigned Serial No. 10-2008-9291, the entire disclosure of any of which is hereby incorporated by reference.

BACKGROUND

1. Field of the Invention

The present invention generally relates to a cellular wireless communication system. More particularly, the present invention relates to an apparatus and method for allocating resources to control information in a cellular wireless communication system.

2. Description of the Related Art

Mobile communication systems were developed to enable users to conduct communications with mobility. The rapid development of technologies has driven the development of the mobile communication systems to provide high-speed data service as well as voice service. Mobile communication systems have been evolving rapidly in order to meet demand for high-speed data service. One such example is Enhanced Universal Terrestrial Radio Access (EUTRA), the future-generation mobile communication standard of the 3$^{rd}$ Generation Partnership Project (3GPP).

Various multiple access schemes are available to mobile communication systems, including Time Division Multiple Access (TDMA), Code Division Multiple Access (CDMA), and Frequency Division Multiple Access (FDMA). Among them, CDMA is popular. However, CDMA has limitations in transmitting a large volume of data at a high rate due to a limited number of orthogonal codes. At present, Orthogonal Frequency Division Multiple Access (OFDMA) and Single Carrier-FDMA (SC-FDMA), which are special cases of FDMA, have been adopted as the respective DownLink (DL) and UpLink (UL) standard technologies of EUTRA.

In the EUTRA system, UL control information includes ACKnowledgment/Negative ACKnowledgment (ACK/NACK) feedback information indicating whether DL data has been received successfully and Channel Quality Indication (CQI) information representing a DL channel state.

The ACK/NACK information is typically 1 bit and is repeatedly transmitted to improve reception performance and expand cell coverage. In general, the CQI information occupies a plurality of bits to indicate the channel state and is channel-encoded prior to transmission to improve reception performance and expand cell coverage. The channel encoding is block coding, convolutional coding, or the like.

The reception reliability requirement of control information depends on the type of the control information. An ACK/NACK requires a Bit Error Rate (BER) of about $10^{-2}$ to $10^{-4}$, lower than the BER requirement of a CQI, ranging from $10^{-2}$ to $10^{-1}$.

In the EUTRA system, when a User Equipment (UE) transmits only a UL control information channel without data, a particular frequency band is allocated for control information transmission. A physical channel dedicated to transmission of control information only is defined as a Physical Uplink Control Channel (PUCCH) which is mapped to the allocated frequency band.

With reference to FIG. 1, a PUCCH transmission structure will now be described.

FIG. 1 illustrates a PUCCH transmission structure for carrying UL control information in the 3GPP EUTRA system.

Referring to FIG. 1, the horizontal axis represents time and the vertical axis represents frequency. One subframe 102 is shown in the time domain and a system transmission bandwidth 110 is shown in the frequency domain. A basic UL transmission unit, the subframe 102 is 1 ms, divided into two 0.5-ms slots 104 and 106. Each of the slots 104 and 106 is composed of a plurality of SC-FDMA symbols 111 to 124 and 131 to 137, or 118 to 124 and 138 to 144. In the illustrated case of FIG. 1, one slot has seven SC-FDMA symbols.

A minimum frequency unit is a subcarrier and a basic resource allocation unit is a Resource Block (RB) 108 or 109. The RBs 108 and 109 each are defined by a plurality of subcarriers and a plurality of SC-FDMA symbols. Herein, 12 subcarriers and 14 SC-FDMA symbols occupying two slots form one RB, by way of example. On the DL to which OFDM is applied, one RB is also composed of 12 subcarriers and 14 OFDM symbols.

A frequency band to which the PUCCH is mapped is the RB 108 or 109 at either end of the system transmission bandwidth 110. Under circumstances, a Node B can allocate a plurality of RBs for PUCCH transmission in order to allow a plurality of users to transmit control information. To increase frequency diversity during one subframe, frequency hopping may apply to the PUCCH and that frequency hopping is done on a slot basis. Reference numerals 150 and 160 denote frequency hopping, which will be described in more detail below.

First control information (Control #1) is transmitted in the RB 108 in the first slot 104 and in the RB 109 in the second slot 106 by frequency hopping. Meanwhile, second control information (Control #2) is transmitted in the RB 109 in the first slot 104 and in the RB 108 in the second slot 106 by frequency hopping.

In the illustrated case of FIG. 1, in the subframe 102, Control #1 is carried in the SC-FDMA symbols 111, 113, 114, 115, 117, 138, 140, 141, 142 and 144 and Control #2 is carried in the SC-FDMA symbols 131, 133, 134, 135, 17, 118, 120, 121, 122 and 124. A Reference Signal (RS) is transmitted in pilot SC-FDMA symbols 112, 116, 139, 143, 132, 136, 119 and 123. The pilot signal is a predetermined sequence with which a receiver performs channel estimation for coherent demodulation. The number of SC-FDMA symbols carrying control information, the number of RS SC-FDMA symbols, and the positions of the SC-FDMA symbols illustrated in FIG. 1 may vary depending on the type of control information to be transmitted or depending on system implementation.

UL control information such as ACK/NACK information, CQI information, and Multiple Input Multiple Output (MIMO) feedback information from different users can be multiplexed in Code Division Multiplex (CDM). CDM is robust against interference, compared to Frequency Division Multiplex (FDM).

A Zadoff-Chu (ZC) sequence is under discussion for CDM-multiplexing of control information. Because the ZC sequence has a constant envelop in time and frequency, it has a good Peak-to-Average Power Ratio (PAPR) characteristic and exhibits excellent channel estimation performance in the frequency domain. Also, the ZC sequence is characterized by a circular auto-correlation of 0 with respect to non-zero shift. Therefore, UEs that transmit their control information using the same ZC sequence can differentiate the control information by use of different cyclic shift values of the ZC sequence.

In a real radio channel environment, different cyclic shift values are allocated to different users to multiplex control information, thereby maintaining orthogonality among the users. Hence, the number of multiple access users is determined according to the length of a ZC sequence and cyclic shift values. The ZC sequence is also applied to RS SC-FDMA symbols and enables RSs from different UEs to be identified by use of cyclic shift values of the ZC sequence.

In general, the length of a ZC sequence used for the PUCCH is assumed to be 12 samples, which is equal to the number of subcarriers forming one RB. In this case, there are up to 12 different cyclic shift values for the ZC sequence and up to 12 PUCCHs can be multiplexed in one RB by allocating the different cyclic shift values to the PUCCHs. A Typical Urban (TU) model being a radio channel model considered for the EUTRA system uses cyclic shift values of at least two-sample intervals. This implies that the number of cyclic shift values is limited to 6 or less for one RB. As a consequence, orthogonality is maintained without radical loss among PUCCHs mapped to the cyclic shift values in a one-to-one correspondence.

FIG. 2 illustrates an example of multiplexing CQIs from users by use of different cyclic shift values of a ZC sequence in the same RB, when the CQIs are transmitted on PUCCHs having the configuration of FIG. 1.

Referring to FIG. 2, a vertical axis 200 represents cyclic shift values of the ZC sequence. Under the TU model, up to six channels can be multiplexed in one RB without rapid loss in orthogonality. Hence, six CQIs 202, 204, 206, 208, 210 and 212 (CQI #1 to CQI #6) are multiplexed. In the illustrated case of FIG. 2, the CQIs are transmitted using the same ZC sequence in the same RB, while cyclic shift value '0' (denoted by reference numeral 214) applies to CQI #1 from UE #1, cyclic shift value '2' (denoted by reference numeral 218) applies to CQI #2 from UE #2, cyclic shift value '4' (denoted by reference numeral 222) applies to CQI #3 from UE #3, cyclic shift value '6' (denoted by reference numeral 226) applies to CQI #4 from UE #4, cyclic shift value '8' (denoted by reference numeral 230) applies to CQI #5 from UE #5, and cyclic shift value '10' (denoted by reference numeral 234) applies to CQI #6 from UE #6.

With reference to FIG. 1, mapping between a control information signal and a ZC sequence in the ZC sequence-based CDM transmission scheme of control information will now be described.

Let a ZC sequence of length N for UE i be denoted by $g(n+\Delta i) \bmod N$ where n is $0, \ldots, N-1$, $\Delta i$ denotes a cyclic shift value for UE i, and i is the index of the UE. Also, let a control information signal to be transmitted from UE i be denoted by $m_{i,k}$ where k is $1, \ldots, N_{sym}$. If $N_{sym}$ is the number of SC-FDMA symbols used for transmission of control information in a subframe, a signal $c_{i,k,n}$ mapped to each SC-FDMA symbol, i.e. an $n^{th}$ sample of a $k^{th}$ SC-FDMA symbol from UE i is given as $$c_{i,k,n} = g(n+\Delta i) \bmod N \cdot m_{i,k} \quad (1)$$

where k is $1, \ldots, N_{sym}$, n is $0, \ldots, N-1$, and $\Delta i$ denotes the cyclic shift value of UE i.

In FIG. 1, the number of SC-FDMA symbols used for transmitting control information in one subframe, $N_{sym}$ is 10, excluding four SC-FDMA symbols for RS transmission. The ZC sequence length N is 12, equal to the number of subcarriers forming one RB. For a single UE, a cyclically shifted ZC sequence is applied to each SC-FDMA symbol and a control information signal to be transmitted is configured by multiplying modulation symbols by the time-domain cyclically shifted ZC sequence, one modulation symbol per SC-FDMA symbol allocated for control information transmission. Therefore, up to $N_{sym}$ modulation symbols of control information can be transmitted in one subframe. That is, up to 10 control information modulation symbols can be transmitted in the one subframe illustrated in FIG. 1.

The multiplexing capacity of PUCCHs that deliver control information can be increased by adding time-domain orthogonal covers to the above ZC sequence-based CDM transmission scheme of control information. A major example of the orthogonal covers is Walsh sequences. For orthogonal covers of length M, there are M sequences that satisfy orthogonality between them. Specifically, time-domain orthogonal covers apply to SC-FDMA symbols to which 1-bit control information like an ACK/NACK is mapped, thus increasing the multiplexing capacity. In the EUTRA system, use of three SC-FDMA symbols per slot is considered for RS transmission on a PUCCH that delivers an ACK/NACK in order to improve the performance of channel estimation. Therefore, when one slot has seven SC-FDMA symbols, as illustrated in FIG. 1, four SC-FDMA symbols are available for ACK/NACK transmission. The use of the time-domain orthogonal covers is limited to one slot or less, to thereby minimize the loss of orthogonality caused by changes in a radio channel. An orthogonal cover of length 4 is applied to the four SC-FDMA symbols for ACK/NACK transmission, while an orthogonal cover of length 3 is applied to the three SC-FDMA symbols for RS transmission. Users that transmit ACKs/NACKs and RSs are basically identified by their cyclic shift values of a ZC sequence and further identified by their orthogonal covers. Since RSs mapped to ACKs/NACKs in a one-to-one correspondence are required for coherent ACK/NACK reception, the multiplexing capacity of ACK/NACK signals is limited by the RSs. For instance, if up to six cyclic shift values are available in one RB under the TU channel model, a different time-domain orthogonal cover of length 3 can be applied to each cyclic shift value of a ZC sequence used for an RS. As a result, RSs from up to 18 different users can be multiplexed. Considering that ACKs/NACKs correspond to RSs one to one, up to 18 ACKs/NACKs can be multiplexed in one RB. In this case, four orthogonal covers of length 4 are available for ACKs/NACKs and three of them are used. The orthogonal covers applied to the ACKs/NACKs are known to both the Node B and the UE by a preliminary agreement or signaling. The use of time-domain orthogonal covers can increase the multiplexing capacity by three times, compared to non-use of time-domain orthogonal covers.

FIG. 3 illustrates an example of multiplexing ACKs/NACKs from users in the same RB by use of different cyclic shift values of a ZC sequence and additional time-domain orthogonal covers in the above-described PUCCH structure for ACK/NACK transmission.

Referring to FIG. 3, a vertical axis 300 represents cyclic shift values of the ZC sequence and a horizontal axis 302 represents time-domain orthogonal covers. In the TU model, up to six channels can be multiplexed in one RB without rapid loss in orthogonality and three orthogonal covers 364, 366 and 368 of length 4 are additionally used. Hence, up to 18 (6×3) ACKs/NACK channels 304, 306, 308, 310, 312, 314, 316, 318, 320, 322, 324, 326, 328, 330, 332, 334, 336 and 338 (ACK/NACK #1 to ACK/NACK #18) can be multiplexed. In the illustrated case of FIG. 3, the ACKs/NACKs are transmitted using the same ZC sequence in the same RB. For the ACK/NACK transmission, cyclic shift value '0' (denoted by reference numeral 340) and orthogonal cover '0' (denoted by reference numeral 364) apply to ACK/NACK #1 from UE #1, cyclic shift value '0' (denoted by reference numeral 340) and orthogonal cover '1' (denoted by reference numeral 366) apply to ACK/NACK #2 from UE #2, and the cyclic shift value '0' (denoted by reference numeral 340) and orthogonal cover '2' (denoted by reference numeral 368) apply to ACK/NACK #3 from UE #3. In this manner, cyclic shift value '10' (denoted by reference numeral 360) and orthogonal cover '0' (denoted by reference numeral 364) apply to ACK/NACK #16 from UE #16, cyclic shift value '10' (denoted by reference numeral 360) and orthogonal cover '1' (denoted by reference numeral 366) apply to ACK/NACK #17 from UE #17, and cyclic shift value '10' (denoted by reference numeral 360) and orthogonal cover '2' (denoted by reference numeral 368) apply to ACK/NACK #18 from UE #18. The orthogonal covers 364, 366 and 368 are orthogonal codes of length 4 that are mutually orthogonal.

The transmission signal format of ACK/NACK channels illustrated in FIG. 3 is detailed in FIG. 4.

FIG. 4 illustrates a transmission format for transmitting ACK/NACK #5 and ACK/NACK #16 in one slot. Referring to FIG. 4, $W_i=[W_{i,0}\ W_{i,1}\ W_{i,2}\ W_{i,3}]$ where i=0, ..., 3 can be a Walsh code of length 4 generated from a Walsh-Hadamard matrix given as $$\begin{bmatrix} W_0 \\ W_1 \\ W_2 \\ W_3 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad (2)$$

$D_i=[D_{i,0}\ D_{i,1}\ D_{i,2}]$ where i=0, ..., 2 can be a Fourier sequence of length 3 expressed as $$\begin{bmatrix} D_0 \\ D_1 \\ D_2 \end{bmatrix} = \begin{bmatrix} +1 & +1 & +1 \\ +1 & e^{j\frac{\pi}{3}} & e^{j\frac{\pi}{3}} \\ +1 & e^{j\frac{\pi}{3}} & e^{j\frac{\pi}{3}} \end{bmatrix} \quad (3)$$

For example, ACK/NACK symbol b of ACK/NACK channel #5 is multiplied by a sequence 405 [s3, s4, ..., s12, s1, s2] resulting from cyclically shifting a ZC sequence of length 12 [s1, s2, ..., s12] by two samples and repeated in SC-FDMA symbols 401 to 404. Then the multiplied sequences are again multiplied by the Walsh sequence chips $W_{1,0}$, $W_{1,1}$, $W_{1,2}$, $W_{1,3}$ of the orthogonal cover '1' in the SC-FDMA symbols 401 to 404. Meanwhile, ACK/NACK symbol b of ACK/NACK channel #16 is multiplied by a sequence 415 [s11, s12, s1 ..., s9, s10] resulting from cyclically shifting the ZC sequence of length 12 [s1, s2, ..., s12] by ten samples and repeated in SC-FDMA symbols 411 to 414. Then the multiplied sequences are again multiplied by the Walsh sequence chips $W_{0,0}$, $W_{0,1}$, $W_{0,2}$, $W_{0,3}$ of orthogonal cover '0' in the SC-FDMA symbols 411 to 414.

Although orthogonality is well preserved among orthogonal cover codes if a channel experiences weak fading, the orthogonality may be lost when a UE moves fast and thus the level of a signal received in one slot fluctuates greatly between SC-FDMA symbols due to time selective fading. Then interference occurs between ACK/NACK channels to which the same cyclic shift value is applied. For example, if UE #1 that transmits ACK/NACK #1 moves fast in FIG. 3, the signal of ACK/NACK #1 interferes with ACKs/NACKs #2 and #3 from other UEs, thereby degrading the reception performance of ACKs/NACKs #2 and #3.

SUMMARY OF THE INVENTION

Accordingly, exemplary embodiments of the present invention provide an apparatus and method for allocating resources to ACK/NACK channels to minimize cross interference between the ACK/NACK channels even in a fast moving environment, in the case where the ACK/NACK channels are multiplexed further with Walsh codes as time-domain orthogonal covers in a system in which ACK/NACK channels are transmitted, being multiplexed in the same frequency resource by use of cyclic shifts of a ZC sequence.

Other exemplary embodiments of the present invention provide an apparatus and method for performing orthogonal cover hopping to minimize the effects of an inter-cell interference and a fast movement of a UE that causes interference, when Walsh codes applied to ACK/NACK channels are changed between slots, that is, orthogonal cover hopping occurs.

Further, exemplary embodiments of the present invention provide a method for allocating orthogonal cover resources so as to minimize the effects of a fast movement of a UE that caused interference, even when orthogonal cover hopping does not occur.

Exemplary embodiments of the present invention provide a method for allocating code resources to ACK/NACK channel indexes, when UEs require ACK/NACK transmission in a wireless communication system, comprising: selecting a predetermined number of orthogonal cover Walsh codes from among available orthogonal cover Walsh codes; forming at least one subset from the selected number of orthogonal cover Walsh codes; arranging in an ascending order of cross interference the selected orthogonal cover Walsh codes; selecting subsets of the arranged Walsh codes for use in first and second slots of a subframe; and allocating the orthogonal cover Walsh codes of the selected subset for each slot and ZC sequence cyclic shift values to the ACK/NACK channel indexes.

In accordance with other exemplary embodiments of the present invention, there is provided an apparatus for allocating resources to ACK/NACK channels of a UE in a wireless communication system, comprising: an ACK/NACK symbol generator that generates an ACK/NACK symbol; an orthogonal cover symbol generator that selects subsets, for use in first and second slots of a subframe, from at least one subset formed by selection of a predetermined number of orthogonal cover Walsh codes from among available orthogonal cover Walsh codes and arrangement of the selected orthogonal cover Walsh codes in an ascending order of cross interference, and generation of an orthogonal cover sequence symbol to be mapped to an ACK/NACK channel that will transmit ACK/NACK information; a first multiplier that multiplies the ACK/NACK symbol by the orthogonal cover sequence symbol; a multiplexer that outputs the multiplied ACK/NACK symbol and a generated RS symbol each at a predetermined symbol timing; a second multiplier that multiplies a signal received from the multiplexer by a ZC sequence; and a subcarrier mapper that allocates the signal received from the second multiplier to a band set for transmission of the control information.

BRIEF DESCRIPTION OF THE DRAWINGS

The above and other features and advantages of certain exemplary embodiments of the present invention will be more apparent from the following detailed description taken in conjunction with the accompanying drawings, in which:

FIG. 5a is a graph illustrating the computer-aided simulation results of the Cumulative Distribution Function (CDF) of cross interference in the case where Walsh codes are used as orthogonal covers for EUTRA UL ACK/NACK channels;

FIG. 5b is a table showing subsets of Walsh codes made according to the simulation results of FIG. 5a;

FIG. 6 illustrates a method for allocating resources to ACK/NACK channels according to an exemplary embodiment of the present invention;

FIG. 7 illustrates a method for allocating resources to ACK/NACK channels according to another exemplary embodiment of the present invention;

FIG. 8 illustrates a method for allocating resources to ACK/NACK channels according to a third exemplary embodiment of the present invention;

FIG. 9 illustrates another method for allocating resources to ACK/NACK channels according to the third exemplary embodiment of the present invention;

FIG. 10 illustrates a method for allocating resources to ACK/NACK channels according to a fourth exemplary embodiment of the present invention;

FIG. 11 illustrates a method for allocating resources to ACK/NACK channels according to a fifth exemplary embodiment of the present invention;

FIG. 12 illustrates a method for allocating resources to ACK/NACK channels according to a sixth exemplary embodiment of the present invention;

FIG. 13 illustrates another method for allocating resources to ACK/NACK channels according to the sixth exemplary embodiment of the present invention;

FIG. 14 illustrates a method for allocating resources to ACK/NACK channels according to a seventh exemplary embodiment of the present invention;

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. For the purposes of simplicity, descriptions of well-known functions and constructions are omitted for clarity and conciseness.

The present invention provides a method for designing an orthogonal cover hopping pattern for ACK/NACK channel transmission, when an orthogonal cover applied to an ACK/NACK channel by a UE changes between slots, that is, orthogonal cover hopping occurs. Also, the present invention provides a method for allocating resources to ACK/NACK channels when orthogonal cover hopping does not occur between slots.

Orthogonal cover hopping of ACK/NACK channels between slots has the effect of randomizing interference from ACK/NACK channels transmitted from neighbor cells in the same frequency band and randomizing interference between ACK/NACK channels within a current cell, caused by a UE's fast movement.

FIG. 5a illustrates the CDF of cross interference among the Walsh codes described in equation (2) in the case where a UE moves at 360 km/h over a single-path Rayleigh fading channel.

Figure 5:
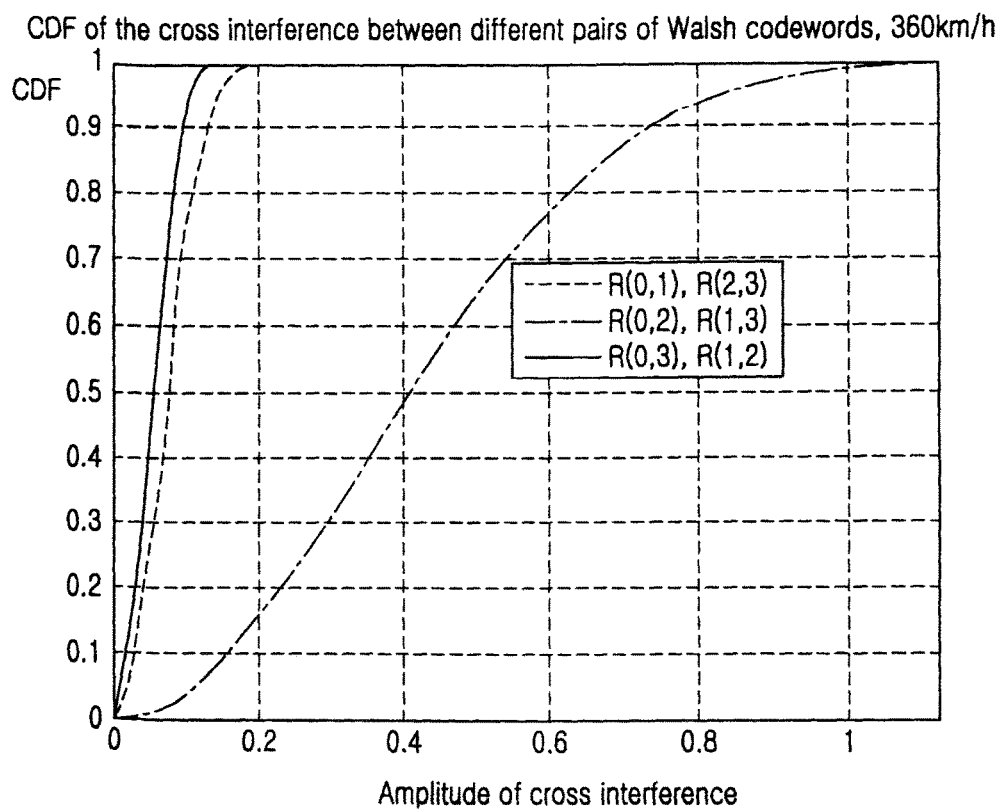

Referring to FIG. 5, $R(i, j)$ denotes the cross interference between Walsh codes $W_i$ and $W_j$. As noted from the graph of FIG. 5a, cross interference varies depending on Walsh codes. For example, $R(0, 3)$ representing the cross interference between Walsh codes, $W_0$ and $W_3$ is less than level 0.1 at a CDF of 90%. This implies that when the UE moves at 360 km/h and thus a channel experiences fading, the interference level between $W_0$ and $W_3$ is 10% (i.e. 0.1) of a maximum interference level of 1, when the CDF is 90%. On the other hand, $R(0, 2)$ representing the cross interference between Walsh codes, $W_0$ and $W_2$ is around 0.75, higher than $R(0, 3)$ at the CDF of 90%.

Figure 3:
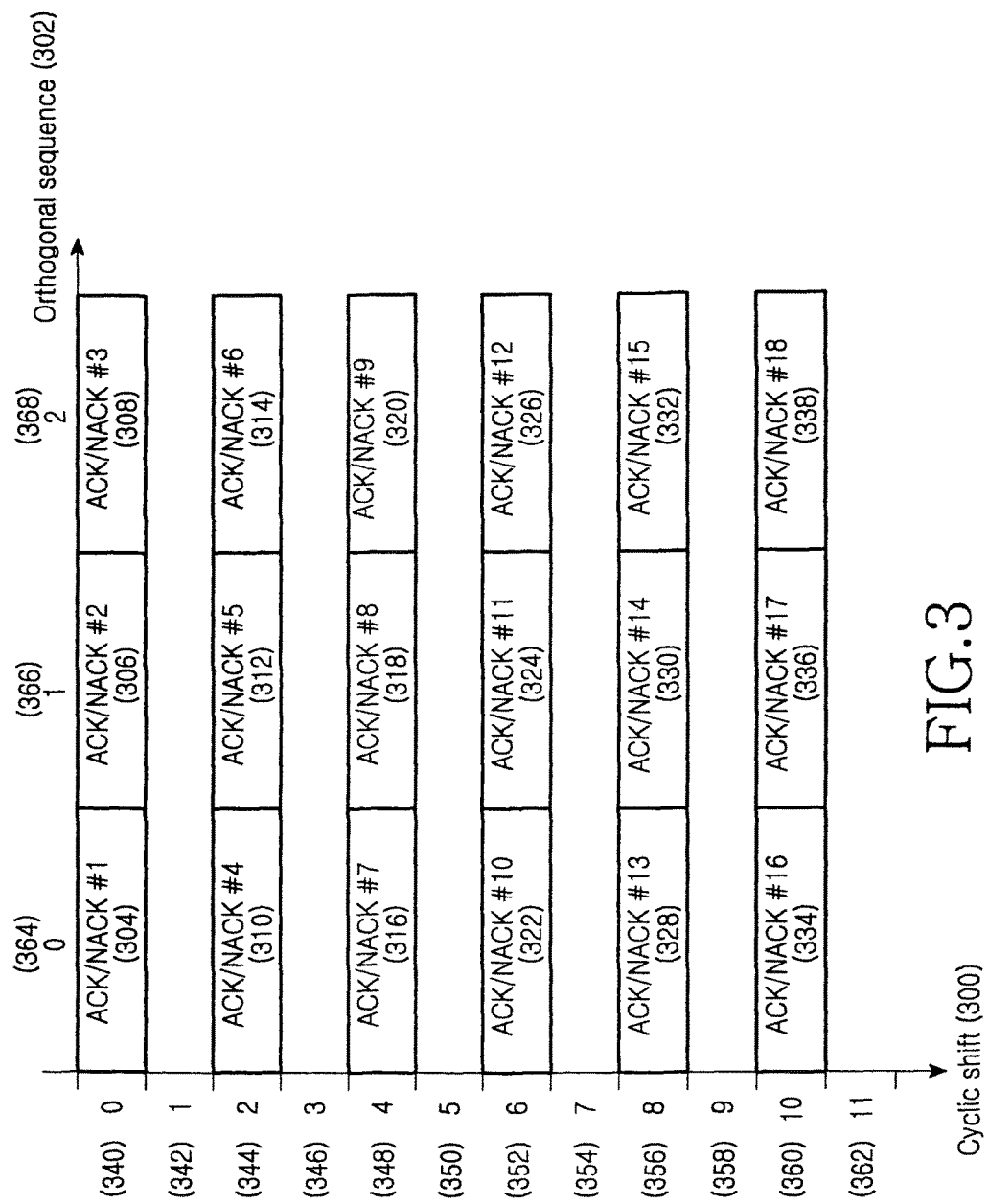
FIG. 3 illustrates an exemplary multiplexing structure of EUTRA UL ACK/NACK channels.

If three Walsh codes are used for ACK/NACK channel transmission in one slot as illustrated in FIG. 3, the subsets shown in FIG. 5b of Walsh codes can be made according to the simulation results of FIG. 5a.

As shown in FIG. 5b, each of the Walsh codes of the Best column interferes least with the other Walsh codes in its subset, referring to the CDF results of interference illustrated in FIG. 5. The Walsh codes of the $2^{nd}$ Best column cause stronger interference than those of the Best column but weaker interference than those of the Worst column in their subsets. The Walsh codes of the Worst column cause the strongest interference in their subsets. Hereinbelow, the Walsh codes of the Best, $2^{nd}$ Best, and Worst columns are referred to as Code A, Code B and Code C in their subsets, respectively.

A comparison in cross interference among the Walsh codes of subset 2, W0, W2 and W3 tells that W3 being Code A has a far smaller cross interference than 0.2 at the CDF of 90%, with respect to both W2 and W0. On the other hand, W2 being Code C in subset 2 has a cross interference close to 0.75 at the CDF of 90%, with respect to W0. W0 being Code B in subset 2 has a cross interference close to 0.75 at the CDF of 90%, with respect to W2 but a cross interference less than 0.1 at the CDF of 90% with respect to W3. Based on the Walsh code subsets listed in Table 1, the present invention provides a method for allocating Walsh code resources to ACK/NACK channels and performing code hopping for the ACK/NACK channels to improve reception performance by randomizing interference between the ACK/NACK channels in a fast-moving UE environment.

The classification of the Walsh codes in subset 2 illustrated in Table 1 coincides with a conclusion reached in APPENDIX A by R1-072857 "Coherent Uplink ACK/NACK Transmission with High Speed UEs" Texas Instrument, Jun. 25, 2007) submitted to 3GPP RAN TSG Working Group 1. Although the R1-072857 document of APPENDIX A discusses only subset 2, the present invention can classify Walsh codes into Best, $2^{nd}$ Best, and Worst in four subsets as done for subset 2. The cross interference levels of the Walsh codes in each subset are the same irrespective of the subsets, which are observed in FIG. 5. In other words, the cross interferences among Code A, Code B and Code C are the same in every subset.

Now a description will be made of a method and apparatus for transmitting and receiving ACK/NACK channels according to exemplary embodiments of the present invention.

Regarding allocation of code resources to ACK/NACK channels, various embodiments can be realized depending on the following conditions.

(1) Whether different subsets are used in two slots forming one subframe by subset hopping;
(2) Whether orthogonal cover Walsh code hopping occurs between two slots forming one subframe (two cases of orthogonal code hopping can be considered as illustrated in FIGS. 6 and 7); and
(3) Whether the sequence of ZC sequence cyclic shift values allocated to ACK/NACK channels in a first slot changes randomly in a second slot.

While embodiments of the present invention that can be realized by combining the above conditions are described below, it is clear that other embodiments achieved by combining the above conditions fall within the scope of the present invention.

FIG. 6 illustrates a method for allocating resources to ACK/NACK channels and an orthogonal cover Walsh code hopping pattern between slots according to first exemplary embodiments of the present invention. The allocation of ZC sequence cyclic shift values to ACK/NACK channels illustrated in FIG. 6 is based on APPENDIX B which comprises R1-072799 technical document "Usage of Cyclic Shifts and Blockwise Spreading Codes for Uplink ACK/NACK", Panasonic, Jun. 25, 2007, of 3GPP RAN TSG Working Group 1.

A description will be provided below of a method for allocating orthogonal cover Walsh codes to ACK/NACK channels using the subsets of Table 1 formed based on the CDF results of FIG. 5 in accordance with first exemplary embodiments of the present invention.

Referring to FIG. 6, the Walsh codes of a column 604 are allocated to ACK/NACK channels in the first slot of a subframe and the Walsh codes of a column 605 are allocated to ACK/NACK channels in the second slot of the subframe. ACK/NACK #0 denoted by reference numeral 630 represents ACK/NACK channel #0. For convenience' sake, the other ACK/NACK channels are represented by their indexes as noted from #12 representing ACK/NACK channel #12 denoted by reference numeral 631. There is no need for allocating ACK/NACK channel indexes in the same pattern as shown in FIG. 6. Rather, it is important to decide what ZC sequence cyclic shift values and what Walsh code resources to use for ACK/NACK channel transmission. In other words, ACK/NACK #0 may exchange places with another ACK/NACK channel.

As proposed in APPENDIX B in the R1-072799 technical document "Usage of Cyclic Shifts and Blockwise Spreading Codes for Uplink ACK/NACK (Panasonic, Jun. 25, 2007) of 3GPP RAN TSG Working Group 1, two ACK/NACK channels are allocated to each of ZC sequences with even cyclic shift values 610, 612, 614, 616, 618 and 620 and one ACK/NACK channel is allocated to each of ZC sequences with odd cyclic shift values 611, 613, 615, 617, 619 and 621.

An important feature of the allocation of Walsh codes to ACK/NACK channels illustrated in FIG. 6 is that Code A having the best cross interference characteristic is allocated to only the ACK/NACK channels transmitted using the ZC sequences with the even cyclic shift values 610, 612, 614, 616, 618 and 620, each of which is allocated to two ACK/NACK channels. For example, in the case of ACK/NACK channels allocated to cyclic shift value 0, Code A 601 is allocated to ACK/NACK #0 in the first slot 604 and Code A 608 is allocated to ACK/NACK #12 in the second slot 605. Similarly, Code B is allocated to the ACK/NACK channels using the ZC sequences with the even cyclic shift values 610, 612, 614, 616, 618 and 620. The reason for allocating Walsh codes having good cross interference characteristics to ACK/NACK channels using the ZC sequences each of which is allocated to two ACK/NACK channels is that interference between ACK/NACK channels using the same cyclic shift value is more severe than interference between ACK/NACK channels using different cyclic shift values. Hence, when orthogonal cover hopping occurs to Code A and Code B between the first and second slots, Code A and Code B are exchanged between different ACK/NACK channels using the same cyclic shift value. For instance, Code A and Code B are alternately used for ACK/NACK #0 and ACK/NACK #12 in the first and second slots by orthogonal cover hopping. The orthogonal cover hopping between slots randomizes interference between neighbor cells and randomizes orthogonality loss between ACK/NACK channels caused by fast movement of a UE. Meanwhile, Code C having the worst cross interference characteristic is allocated to ACK/NACK channels with cyclic shift values each of which is allocated to one ACK/NACK channel. For these ACK/NACK channels, orthogonal cover hopping does not occur between slots. Since Code C causes strong cross interference relative to Code A and Code B, it is allocated to ACK/NACK channels with cyclic shift values each being allocated to a single ACK/NACK channel, to thereby prevent cross interference.

The above-described orthogonal code resource allocation method will be more detailed, taking the case where subset 0 of Table 1 is used for ACK/NACK channel transmission. Referring to FIG. 6, orthogonal code hopping occurs for the ACK/NACK channels with cyclic shift value 0 by allocating W1 being Code A in subset 0 alternately to ACK/NACK #0 and ACK/NACK #12 in the first and second slots. W2 being Code B in subset 0 is allocated alternately to ACK/NACK #12 and ACK/NACK #0 in the first and second slots. W0 being Code C in subset 0 is dedicated to ACK/NACK #6 with cyclic shift value 1 adjacent to cyclic shift value 0. The orthogonal cover Walsh codes of the other subsets are allocated to ACK/NACK channels according to Table 1 and FIG. 6.

The case where orthogonal cover hopping occurs between slots has been described above. Without orthogonal cover hopping, one of the orthogonal cover allocations in the first and second slots 604 and 605 applies to both the slots 604 and 605. While it is assumed in FIG. 6 that 12 cyclic shift values available in one RB are used for ACK/NACK channel transmission, to which the present invention is not limited, some of the cyclic shift values can be allocated to control channels other than ACK/NACK channels, such as CQI channels.

FIG. 7 illustrates a method for allocating resources to ACK/NACK channels according to second exemplary embodiments of the present invention. As in the first exemplary embodiments of the present invention illustrated in FIG. 6, this resource allocation method allocates Walsh code resources when the three Walsh codes of a subset are used as orthogonal covers for ACK/NACK channel transmission.

As in the first exemplary embodiments of the present invention illustrated in FIG. 6, Code A is used for ACK/NACK channels using cyclic shift values each of which is allocated to two ACK/NACK channels and orthogonal code hopping occurs between the two channels on a slot basis. Compared with the first exemplary embodiment of the present invention, Code C is used for ACK/NACK channels with odd cyclic shift values in the first slot, and is allocated to ACK/NACK channels that used Code A in the first slot, in the second slot.

To be more specific, for example, in FIG. 7 ACK/NACK #0 uses Code A in the first slot as indicated by reference numeral 706 and uses Code C in the second slot as indicated by reference numeral 708. ACK/NACK #12 using the same cyclic shift value as ACK/NACK #0 uses code B as indicated by reference numeral 707 in the first slot and uses Code A as indicated by reference numeral 709 in the second slot. ACK/NACK #6 with a cyclic shift value one offset apart from the cyclic shift value of ACK/NACK #0 and ACK/NACK #12 uses Code C in the first slot as indicated by reference numeral 710 and uses Code B in the second slot as indicated by reference numeral 711.

Compared to the first exemplary embodiments of the present invention, the second exemplary embodiments of the present invention performs orthogonal cover hopping ACK/NACK channels using Code C on a slot basis, thus further randomizing inter-cell interference. Even though Code C hops to ACK/NACK channels using cyclic shift values each of which is allocated to two ACK/NACK channels, Code A still hops only between the ACK/NACK channels using the cyclic shift values each of which is allocated to two ACK/NACK channels. As noted from FIG. 5, if Code B and Code C are used for ACK/NACK channels using the same cyclic shift value, cross interference gets very severe and thus performance degrades greatly in a fast moving environment. Yet, the cross interference between Code A and Code C is very small, 0.2 or less at a CDF of 90% in FIG. 5. The first and second exemplary embodiments of the present invention both employ one subset in two slots.

Now a description will be made of a method for allocating orthogonal code resources to ACK/NACK channels when different subsets are used in two slots according to third exemplary embodiments of the present invention.

Third exemplary embodiments of the present invention provide a method for allocating orthogonal code resources to ACK/NACK channels when different subsets are used in the first and second slots. The use of different subsets in the first and second slots, i.e. subset hopping further enhances the effects of randomization of inter-cell interference.

Referring to FIG. 8, the Walsh codes of subset i are used in the first slot, whereas the Walsh codes of subset k are used in the second slot. Aside from subset hopping between slots, the third exemplary embodiments of the present invention perform orthogonal cover hopping in the same manner as in the first exemplary embodiments of the present invention.

That is, for example, ACK/NACK #0 uses Code A of subset i in the first slot and Code B of subset k in the second slot. Similarly, ACK/NACK #12 uses Code B of subset i in the first slot and Code A of subset k in the second slot. ACK/NACK #6 uses Code C in the two slots, Code C of the first slot being from subset i and Code C of the second slot being from subset k. Thus, when the Walsh codes of subset 0 apply to the first slot and the Walsh codes of subset 1 apply to the second slot, W0 and W1 apply as orthogonal covers to ACK/NACK #0 in the first and second slots, respectively, referring to the column Code C of Table 1.

Meanwhile, fourth embodiments provide a method for allocating orthogonal cover resources to ACK/NACK channels illustrated in FIG. 9 is an extension of the orthogonal cover resource allocation scheme illustrated in FIG. 7 according to the third exemplary embodiments of the present invention. The orthogonal cover resource allocation of FIG. 9 differs from the orthogonal cover resource allocation of FIG. 7 in that subset hopping takes place between slots such that the Walsh codes of subset i are used in the first slot and the Walsh codes of subset k are used in the second slot. Therefore, Code A of subset i applies to ACK/NACK #0 in the first slot and Code C of subset k applies to ACK/NACK #0 in the second slot. ACK/NACK #12 with the same cyclic shift value as ACK/NACK #0 uses Code B of subset i in the first slot and Code A of subset k in the second slot. ACK/NACK #6 transmitted alone with a cyclic shift value one offset apart from the cyclic shift value of ACK/NACK #0 and ACK/NACK #12 uses Code C of subset i in the first slot and Code B of subset k in the second slot.

Third and fourth exemplary embodiments of the present invention are the same in that different subsets are used in the first and second slots and differ in that subset hopping takes place between slots without orthogonal code hopping in fourth exemplary embodiments of the present invention.

Referring to FIG. 10, ACK/NACK #0 uses Code A in the two slots, and ACK/NACK #12 and ACK/NACK #6 use Code B and Code C, respectively in the two slots. In the case where subset 0 applies to the first slot and subset 1 applies to the second slot, ACK/NACK #0 uses W1 and W0 as orthogonal covers in the first and second slots, respectively according to the column Code A of Table 1. This orthogonal cover resource allocation method aims at randomization of inter-cell interference, not randomization of interference between ACK/NACK channels caused by fast UE movement.

If a Node B can estimate the velocity of each UE and allocate an ACK/NACK channel with Code A to a fast UE, the effects of interference can be reduced, compared to allocation of Code A to different ACK/NACK channels in different slots. That is, when the Node B cannot allocate ACK/NACK channels to UEs according to their velocities, the ACK/NACK orthogonal cover resource allocation methods using orthogonal cover hopping according to the first, second and third exemplary embodiments of the present invention are more efficient. Yet, if the Node B can allocate Code A to a fast UE according to its velocity, the fast UE is allowed to keep using Code A in the two slots, thus reducing the effects of interference on other ACK/NACK channels. Also, since different subsets are used in different slots, the randomization of inter-cell interference can be achieved in fourth exemplary embodiments as in the previously discussed other exemplary embodiments of the present invention.

Regarding the subsets listed in Table 1, use of different subsets for ACK/NACK transmission in different cells can randomize inter-cell interference. For example, when four neighbor cells use subsets 0, 1, 2 and 3 of Table 1 or randomly selected subsets and UEs within the cells transmit ACK/NACK channels using their subsets according to the orthogonal code allocation schemes illustrated in FIGS. 6 to 9, the inter-cell interference randomization is achieved. In the resource allocation schemes illustrated in FIGS. 8 and 10, the inter-cell interference randomization can be realized by applying subset hopping patterns to cells randomly.

Figure 19:
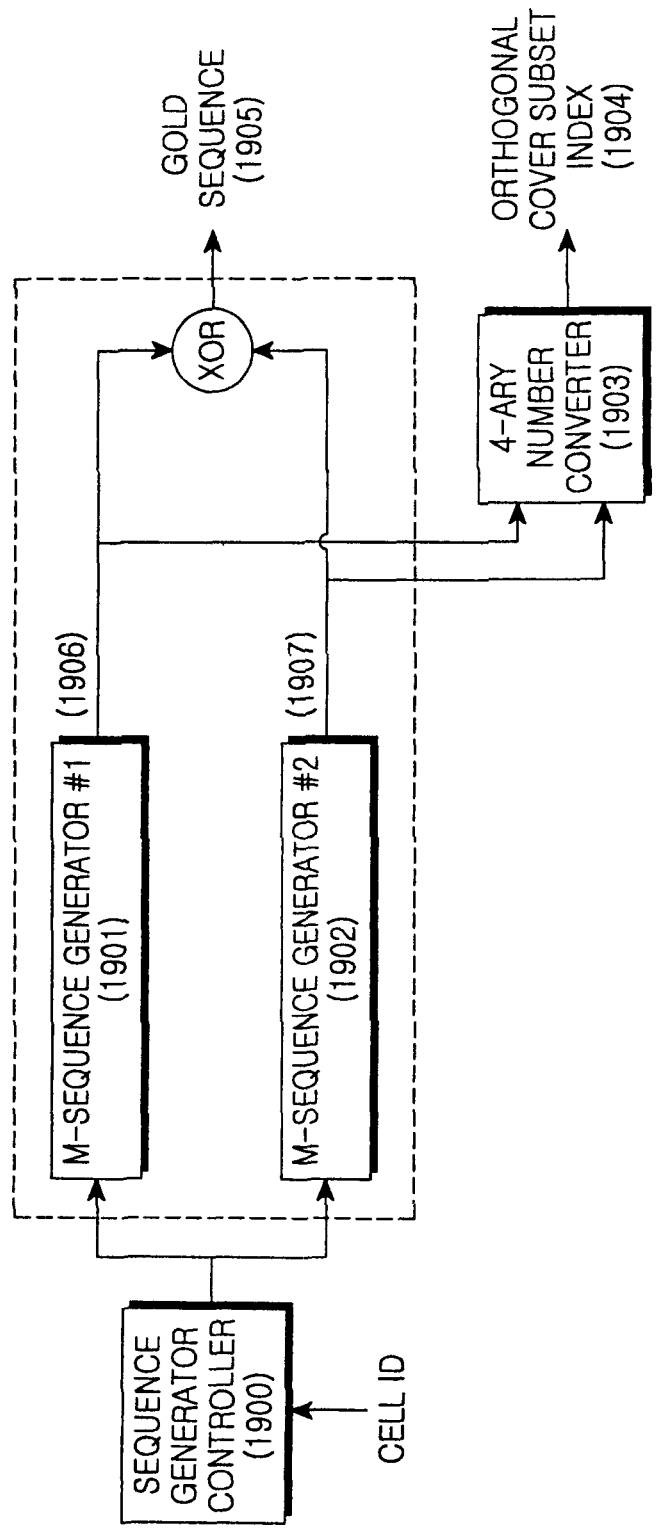
FIG. 19 is a block diagram illustrating an apparatus for generating an orthogonal code subset hopping pattern according to the fourth exemplary embodiment of the present invention.

For instance, FIG. 19 illustrates a Gold scrambling sequence generator that was designed for transmitting a data channel or a control channel like a CQI channel and that is now utilized for generating an orthogonal cover hopping pattern.

Referring to FIG. 19, a Gold sequence 1905 is generated by XOR-operating binary sequences 1906 and 1907 output from two m-sequence generators 1901 and 1902. The Gold sequence generator applies a random sequence to each cell because a sequence generation controller 1900 sets an initial sequence according to a cell Identifier (ID). A cell-specific orthogonal code subset hopping pattern is acquired by converting two bits of the binary sequences 1906 and 1907 to a value ranging from 0 to 3 in a 4-ary number converter 1903 and selecting one of the four subsets listed in Table 1 according to the value in every slot. The m-sequence generators 1901 and 1902 can share the sequence generator used for scrambling data and a control channel or use a different device from the scrambling code generator, for the purpose of generating an orthogonal code hopping pattern.

ACK/NACK channels change their cyclic shift values of a ZC sequence used in the first slot to random ones in the second slot in fifth exemplary embodiments of the present invention.

Referring to FIG. 11, ACKs/NACKs #0, 1, 2, 3, 4 and 5 using Code A of subset i are mapped to cyclic shift values 0, 2, 4, 6, 8 and 10 in the first slot and ACKs/NACKs #1, 3, 5, 0, 2 and 4 using Code B of subset k are mapped to the cyclic shift values 0, 2, 4, 6, 8 and 10 in the second slot. Similarly, ACK/NACK channels using Code B or Code C of subset i in the first slot use different cyclic shift values in the second slot from the cyclic shift values used in the first slot and the sequence of ACK/NACK channels mapped to the cyclic shift values is also changed in the second slot. That is, ACK/NACK channels using Code C in the second slot are allocated to the cyclic shift values 0 to 11 in the order of ACKs/NACKs #10, 7, 9, 11, 6 and 8. ACK/NACK channels using Code A in the second slot are allocated to the cyclic shift values 0 to 11 in the order of ACKs/NACKs #15, 17, 12, 14, 16 and 13. The ACK/NACK transmission scheme illustrated in FIG. 8 is the same as that illustrated in FIG. 11 in that orthogonal covers mapped to ACK/NACK channels hop between slots, but differs from that illustrated in FIG. 11 in that cyclic shift values change to a random pattern in the second slot for ACK/NACK channels using the same orthogonal cover.

Similarly to the first through fourth exemplary embodiments of the present invention, Code A of the subsets listed in Table 1 is always allocated to one of two ACK/NACK channels allocated to the same cyclic shift value. It is because Code A can minimize fast UE-caused cross interference between ACK/NACK channels.

A sixth exemplary embodiment of the present invention illustrated in FIG. 12 is very similar to the third exemplary embodiment of the present invention illustrated in FIG. 9. That is, in the second slot, ACKs/NACKs #0 to 5 use Code C of subset k, ACKs/NACKs #6 to 11 use Code B of subset k, and ACKs/NACKs #12 to 17 use Code A of subset k. However, ACKs/NACKs #0 to 5 are mapped to even cyclic shift values in the first slot and odd cyclic shift values in the second slot, and ACKs/NACKs #6 to 11 are mapped to odd cyclic shift values in the first slot and even cyclic shift values in the second slot. That is, in addition to orthogonal cover hopping, cyclic shift values are changed between slots. In other words, although the first and second slots use the same combination of orthogonal cover codes selected from entire code resources and the same combination of cyclic shift values, ACK/NACK channels using the code resources change between the two slots. For instance, ACK/NACK #6 and ACK/NACK #0 are allocated to code resources corresponding to Code C and cyclic shift value 1 in the first and second slots, respectively.

Meanwhile, an ACK/NACK transmission scheme illustrated in FIG. 13 further uses the above-described cyclic shift hopping in addition to the ACK/NACK transmission scheme illustrated in FIG. 11. In FIG. 13, besides random cyclic shift hopping and orthogonal code hopping, ACKs/NACKs #6 to 11 are allocated to odd cyclic shift values in the first slot and to even cyclic shift values in the second slot, and ACKs/NACKs #12 to 15 are allocated to even cyclic shift values in the first slot and to odd cyclic shift values in the second slot.

In the above exemplary embodiments of the present invention, subset i of the first slot and subset k of the second slot may be identical, to which the present invention is not limited. In accordance with a seventh exemplary embodiment of the present invention, ACK/NACK channels transmitted with the same orthogonal code in the first slot can be transmitted in the second slot by random orthogonal code hopping and random cyclic shift hopping.

In seventh exemplary embodiments and referring to FIG. 14, ACKs/NACKs #0 to 5 use the same Code A in the first slot and hop randomly to Code A, Code B and Code C in the second slot, compared to the previous exemplary embodiments of the present invention in which ACKs/NACKs #0 to 5 hop to the same orthogonal codes in the second slot. The random orthogonal code hopping occurs also to ACKs/NACKs #6 to 11 and #12 to 17. Despite the random orthogonal code hopping and the random cyclic shift hopping, Code A of subsets is always allocated to ACK/NACK channels with cyclic shift values each of which is allocated to two ACK/NACK channels. As stated before, Code A causes less interference than any other orthogonal code.

Figure 15:
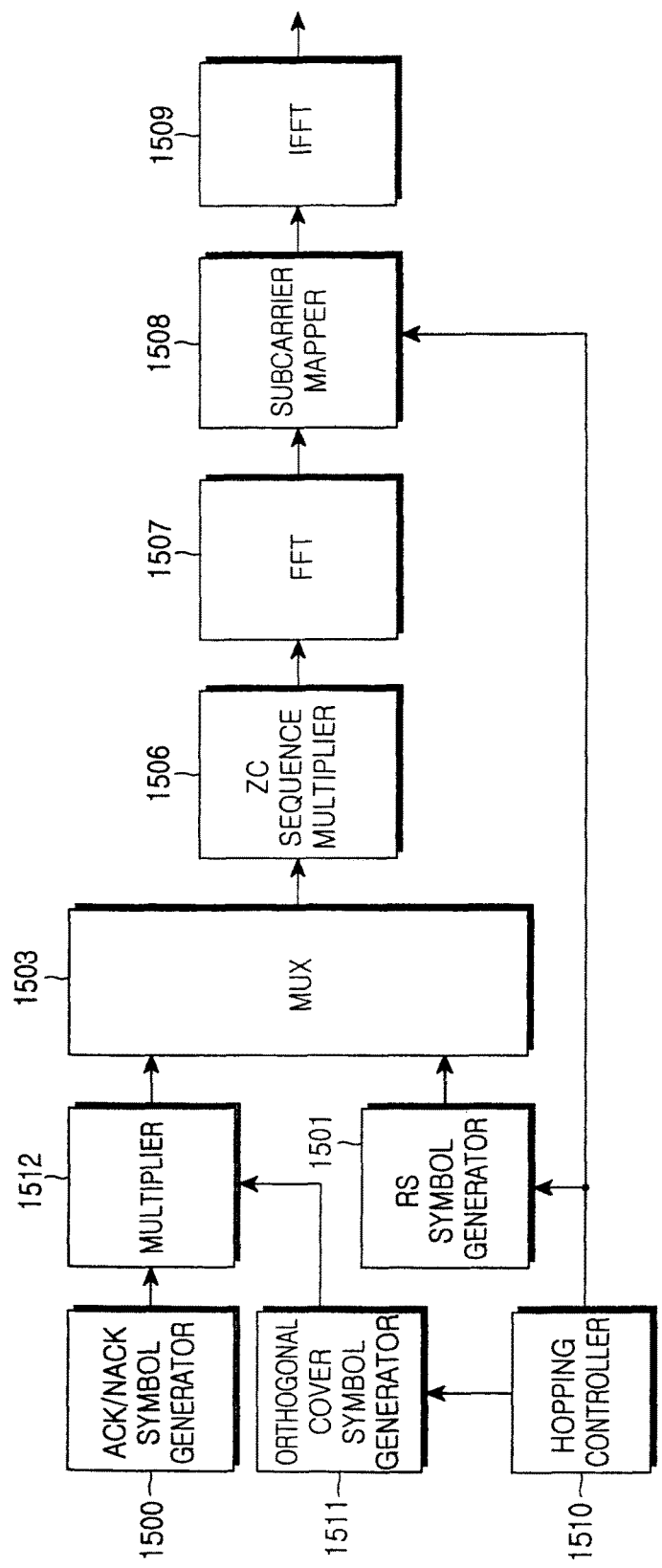
FIG. 15 is a block diagram illustrating a transmitter of a UE according to an exemplary embodiment of the present invention.

FIG. 15 is a block diagram of a UE transmitter according to an exemplary embodiment of the present invention.

Figure 1:
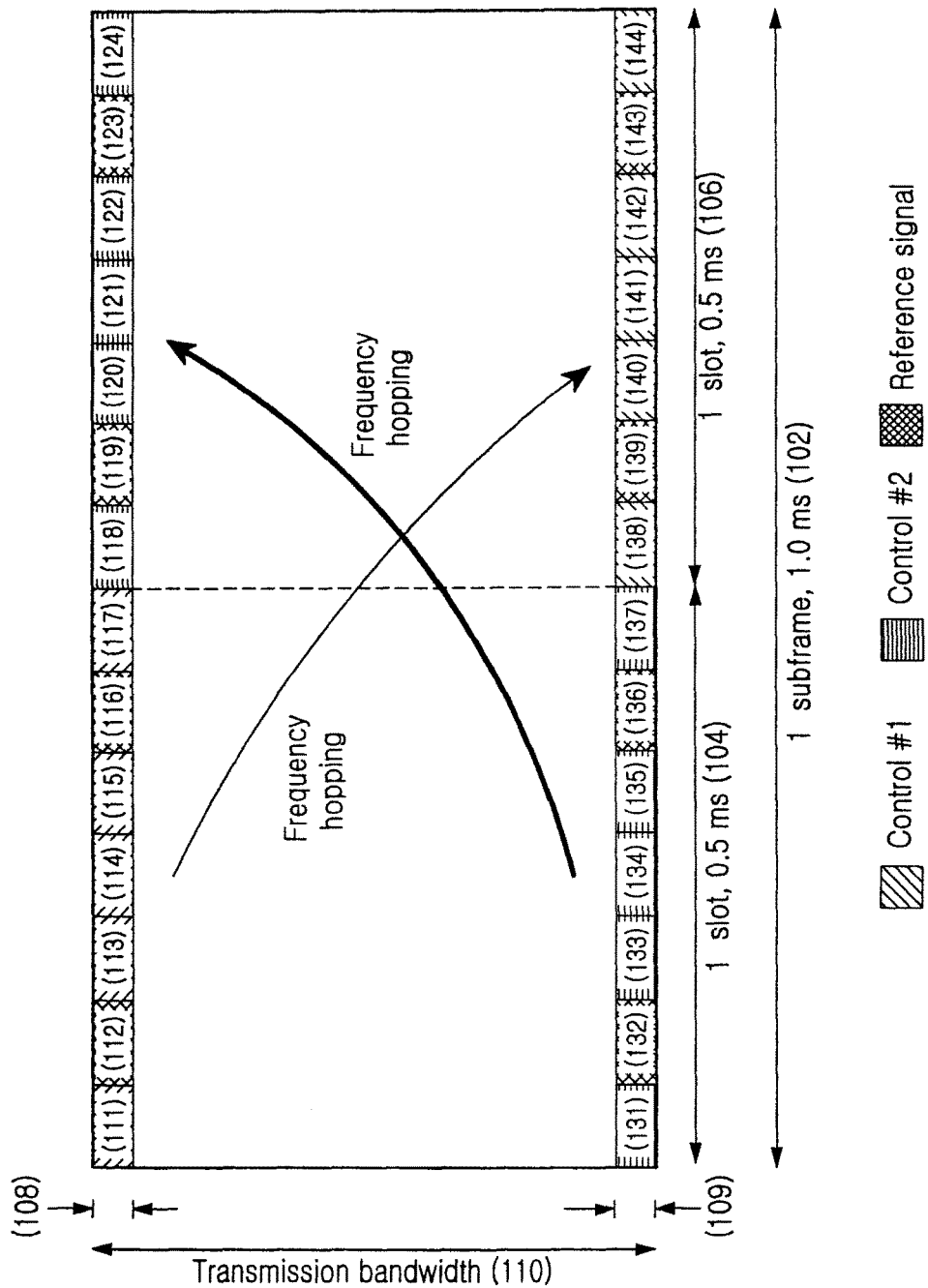
FIG. 1 illustrates the structure of a EUTRA UL control channel.
Figure 2:
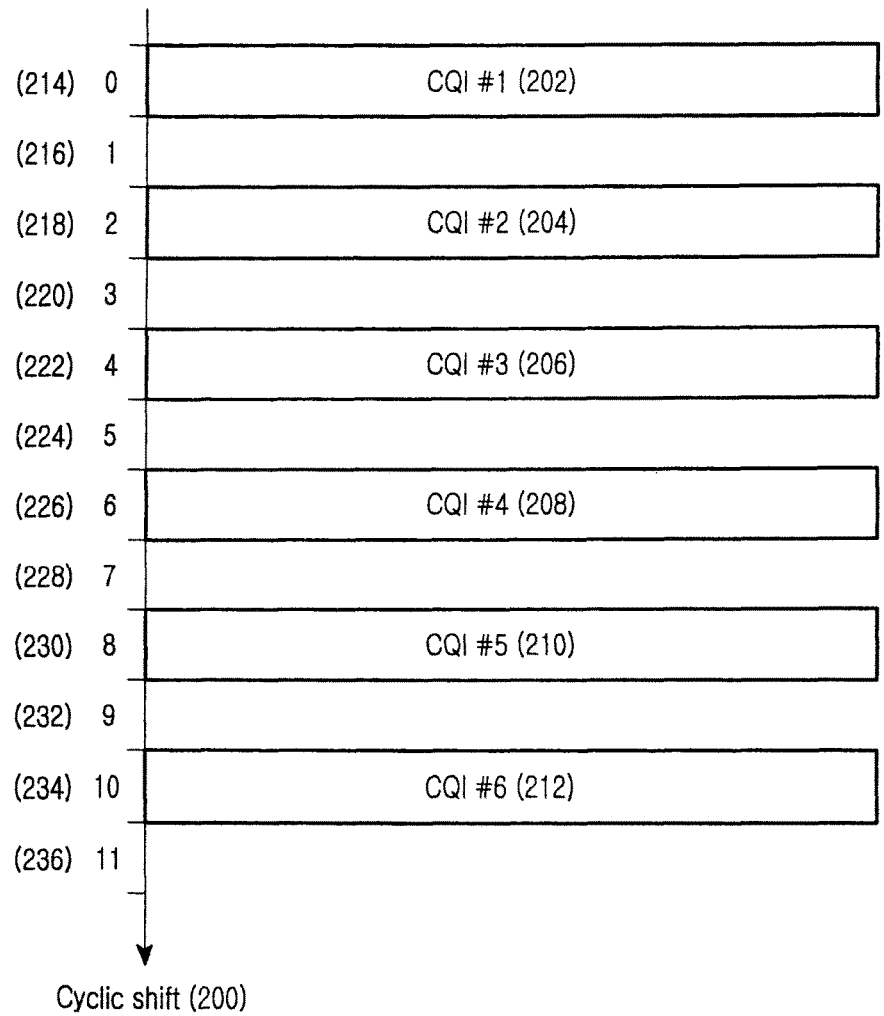
FIG. 2 illustrates an exemplary multiplexing structure of EUTRA UL CQI channels.
Figure 4:
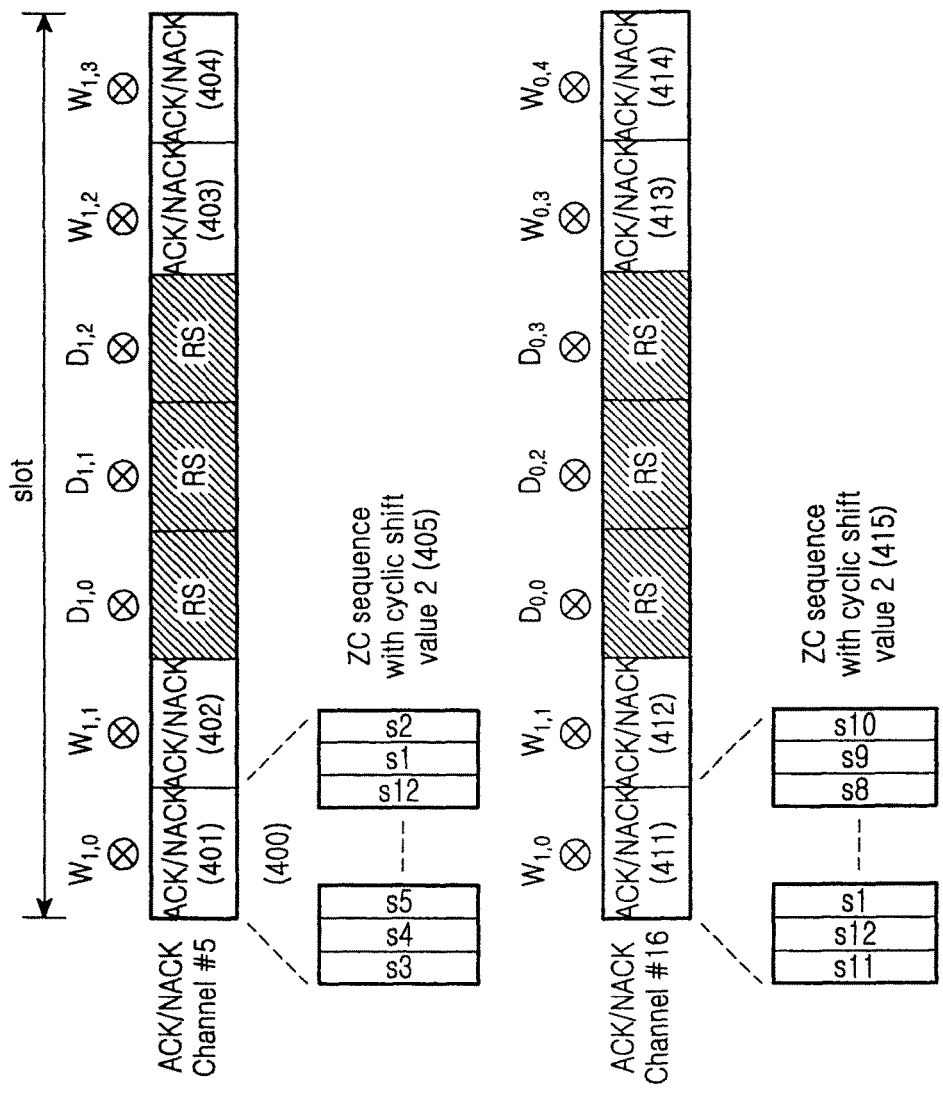
FIG. 4 illustrates an exemplary subframe structure of EUTRA UL ACK/NACK channels.

Referring to FIG. 15, an ACK/NACK symbol generator 1500 generates ACK/NACK symbols to be transmitted. An orthogonal cover symbol generator 1511 generates orthogonal cover sequence symbols mapped to an ACK/NACK channel that will carry the ACK/NACK information. Under the control of a hopping controller 1510, the orthogonal cover symbol generator 1511 can generate different orthogonal covers for first and second slots. A multiplier 1012 multiplies the ACK/NACK symbols by the orthogonal cover symbols. A multiplexer (MUX) 1003 outputs a multiplied ACK/NACK symbol or an RS symbol at an SC-FDMA symbol timing as illustrated in FIG. 4 to a ZC sequence multiplier 1506. The ZC sequence multiplier 1506 multiplies the received ACK/NACK symbol or RS symbol by a ZC sequence. Like the ACK/NACK symbol, the RS symbol is also multiplied by an RS orthogonal cover corresponding to the index of the ACK/NACK channel. A Fast Fourier Transform (FFT) processor 1007 processes the symbol received from the ZC sequence multiplier 1006 by FFT. A subcarrier mapper 1508 maps the FFT signals to subcarriers corresponding to a frequency band allocated to the control information. Under the control of the hopping controller 1510, the subcarrier mapper 1508 maps FFT signals to subcarriers corresponding to an opposite frequency band, for transmission in the second slot as illustrated in FIG. 1. An Inverse Fast Fourier Transform (IFFT) processor 1509 processes the mapped subcarrier signals by IFFT.

Figure 16:
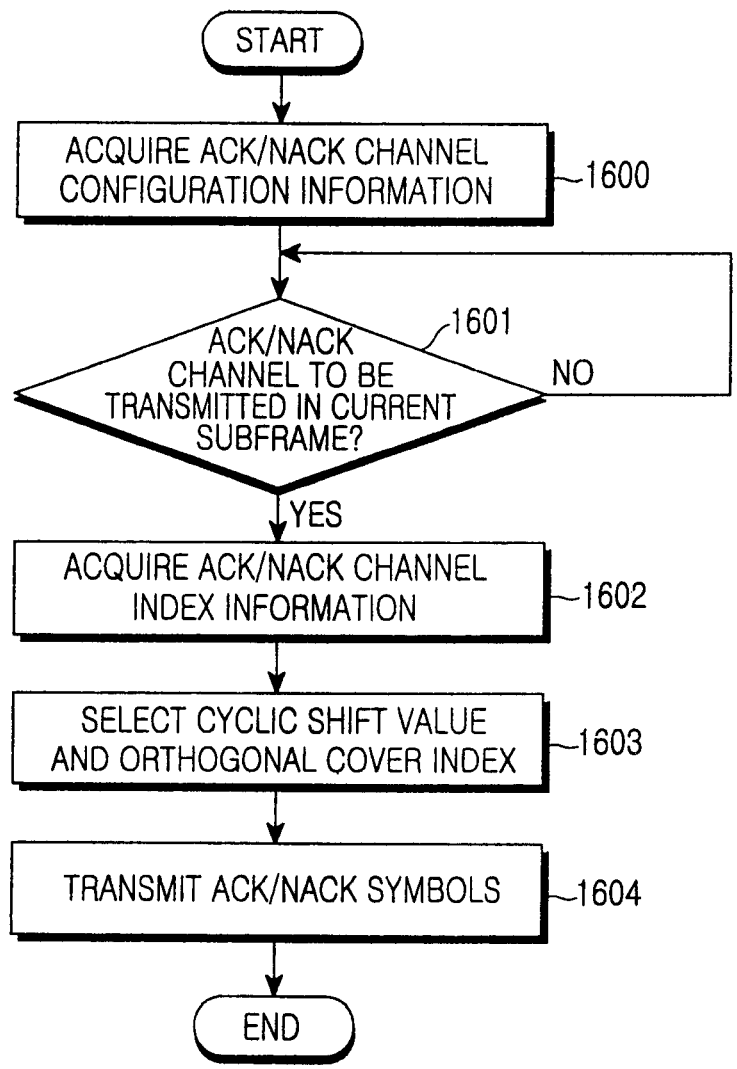
FIG. 16 is a flowchart illustrating a transmission method of the UE according to an exemplary embodiment of the present invention.

FIG. 16 is a flowchart illustrating a transmission method of a UE according to an exemplary embodiment of the present invention.

Referring to FIG. 16, the UE acquires ACK/NACK channel configuration information on a common control channel for transmitting system information, or by higher signaling information. When the UE establishes a call setup with a cell or needs to transmit an ACK/NACK, the ACK/NACK channel configuration information is acquired.

In step 1601, the UE determines whether an ACK/NACK is to be transmitted in a current subframe. A main event requiring ACK/NACK transmission is reception of a data channel from a Node B. If the ACK/NACK information is to be transmitted in step 1601, the UE acquires the index of an ACK/NACK channel to deliver an ACK/NACK symbol in step 1602. The ACK/NACK channel information can be received explicitly from the Node B or acquired implicitly from a DL control channel or a data channel. The UE selects an orthogonal cover sequence index and a ZC sequence cyclic shift value according to the ACK/NACK channel configuration information and the ACK/NACK channel index information in step 1603. As described above, step 1603 can be performed in accordance with one of the seven exemplary embodiments of the present invention. In step 1604, the UE transmits the ACK/NACK symbol using the orthogonal cover sequence and a ZC sequence cyclically shifted by the cyclic shift value.

Figure 17:
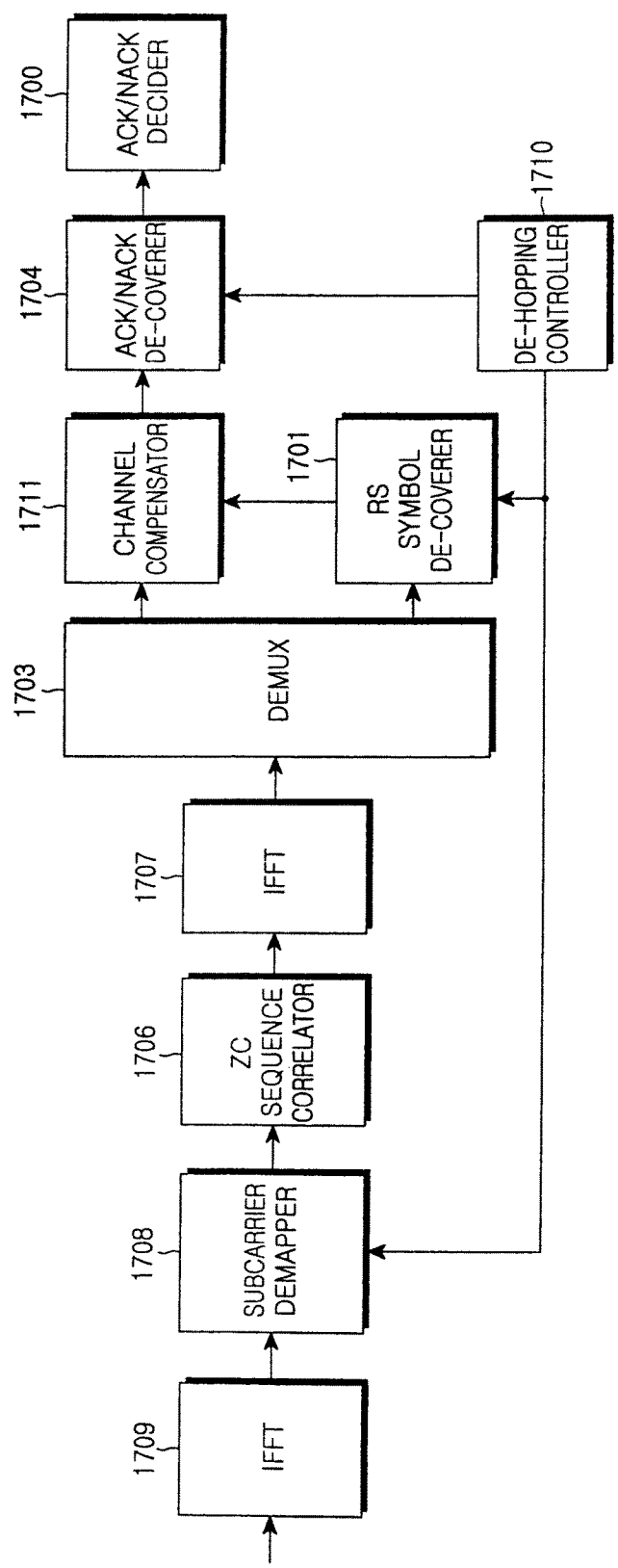
FIG. 17 is a block diagram illustrating a receiver of a Node B according to an exemplary embodiment of the present invention.

FIG. 17 is a block diagram of a Node B receiver according to an exemplary embodiment of the present invention.

An FFT processor 1709 processes a received signal by FFT. A subcarrier demapper 1708 selects FFT subcarrier signals corresponding to an ACK/NACK channel transmission band of a target UE. A ZC sequence correlator 1206 correlates the FFT subcarrier signals with a ZC sequence applied to a current symbol and provides the resulting signal to an IFFT processor 1707. The output of the IFFT 1707 is provided to a DEMUX 1703. If a current SC-FDMA symbol index indicates an RS symbol, the DEMUX 1703 outputs the RS symbol to an RS symbol de-coverer 1701. The RS symbol de-coverer 1701 de-covers an orthogonal cover from the RS symbol, thus obtaining a channel estimate value. A channel compensator 1711 channel-compensates an ACK/NACK symbol acquired using the channel estimate value. An ACK/NACK de-coverer 1704 decovers an orthogonal cover from the ACK/NACK channel. An ACK/NACK decider 1700 decides the value of the received ACK/NACK symbols.

Figure 18:
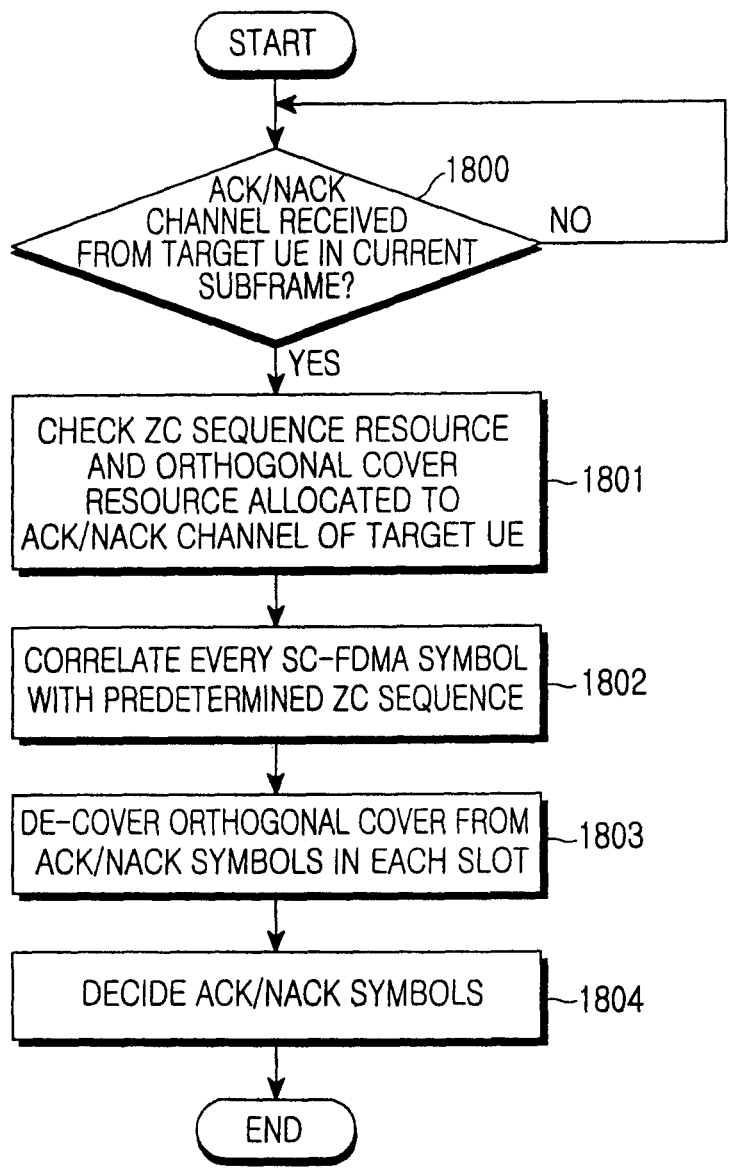
FIG. 18 is a flowchart illustrating a reception method of the Node B according to an exemplary embodiment of the present invention.

FIG. 18 is a flowchart illustrating a reception method of a Node B according to an exemplary embodiment of the present invention.

Referring to FIG. 18, the Node B receiver determines whether it is supposed to receive an ACK/NACK symbol in a current subframe from a target UE in step 1800. If it is, the Node B receiver checks a ZC sequence cyclic shift value and an orthogonal cover index allocated to an ACK/NACK channel of the UE in step 1801. The Node B may have transmitted the resource information to the UE explicitly or implicitly by mapping the resource information to the index of a DL data channel associated with the ACK/NACK channel or the index of a control channel that delivers scheduling information about the data channel. In step 1802, the Node B correlates a received ACK/NACK channel with a ZC sequence based on the resource information. The Node B de-covers the orthogonal covers of the ACK/NACK symbols on a slot basis, in relation to the correlation result in step 1803. In step 1804, the Node B decides ACK/NACK symbols that the UE transmitted on the ACK/NACK channel based on the de-covered ACK/NACK symbol values.

As is apparent from the above description, the orthogonal cover allocation and hopping technology according to the present invention advantageously reduces interference between multiplexed ACK/NACK channels that use the same cyclically shifted ZC sequence even in a fast moving environment and randomizes interference between neighbor cells. Therefore, the reception performance of a UL ACK/NACK channel is improved and cell coverage is expanded.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for receiving acknowledgment/negative acknowledgment (ACK/NACK) information at a base station (BS) in a wireless communication system, the apparatus comprising:

a transmitter configured to transmit data to a user equipment (UE);

a controller configured to determine a combination of a cyclic shift value and an orthogonal cover code for ACK/NACK transmission; and a receiver configured to receive ACK/NACK information for the transmitted data using the determined cyclic shift value and orthogonal cover code, the orthogonal cover code is selected from a group consisting of [+1 +1 +1 +1], [+1 −1 +1 −1], and [+1 −1 −1 +1], wherein a first set, a second set, and a third set of ACK/NACK channel indexes being usable for transmitting the ACK/NACK information are sequentially allocated to [+1 +1 +1 +1], [+1 −1 +1 −1], and [+1 −1 −1 +1] in a first slot of a subframe, the first set comprising lower indexes of ACK/NACK channels and the third set comprising upper indexes of ACK/NACK channels, and wherein the ACK/NACK channel indexes in a set corresponding to each of [+1 +1 +1 +1], [+1 −1 +1 −1], and [+1 −1 −1 +1] are allocated in an ascending order of a plurality of cyclic shift values.

2. The apparatus of claim 1, wherein different combinations each comprising a cyclic shift value and an orthogonal cover code are used for ACK/NACK transmission in two different slots of the subframe, and wherein different frequency bands are used for ACK/NACK transmission in the two different slots of the subframe based on an ACK/NACK channel index corresponding to the determined cyclic shift value and orthogonal cover code.

3. The apparatus of claim 1, wherein the orthogonal cover code is selected from among orthogonal cover codes mapped to different ACK/NACK channel indexes in two different slots of the subframe.

4. The apparatus of claim 1, wherein ACK/NACK channel indexes being usable for transmitting the ACK/NACK information in the first slot of the subframe are randomly changed in a second slot of the subframe.

5. The apparatus of claim 1, wherein the ACK/NACK channel indexes allocated to [+1 +1 +1 +1] in the first slot are allocated to at least two of [+1 +1 +1 +1], [+1 −1 +1 −1], and [+1 −1 −1 +1] in a second slot of the subframe.

6. An apparatus for transmitting acknowledgment/negative acknowledgment (ACK/NACK) information at a user equipment (UE) in a wireless communication system, the apparatus comprising:
 a receiver configured to receive data from a base station (BS);
 a controller configured to acquire a combination of a cyclic shift value and an orthogonal cover code for ACK/NACK transmission; and
 a transmitter configured to transmit ACK/NACK information for the received data using the acquired cyclic shift value and orthogonal cover code,
 wherein the orthogonal cover code is selected from a group consisting of [+1 +1 +1 +1], [+1 −1 +1 −1], and [+1 −1 −1 +1], wherein a first set, a second set, and a third set of ACK/NACK channel indexes being usable for transmitting the ACK/NACK information are sequentially allocated to [+1 +1 +1 +1], [+1 −1 +1 −1], and [+1 −1 −1 +1] in a first slot of a subframe, the first set comprising lower indexes of ACK/NACK channels and the third set comprising upper indexes of ACK/NACK channels, and
 wherein the ACK/NACK channel indexes in a set corresponding to each of [+1 +1 +1 +1], [+1 −1 +1 −1], and [+1 −1 −1 +1] are allocated in an ascending order of a plurality of cyclic shift values.

7. The apparatus of claim 6, wherein different combinations each comprising a cyclic shift value and an orthogonal cover code are used for ACK/NACK transmission in two different slots of the subframe, and
 different frequency bands are used for ACK/NACK transmission in the two different slots of the subframe based on an ACK/NACK channel index corresponding to the determined cyclic shift value and orthogonal cover code.

8. The apparatus of claim 6, wherein the orthogonal cover code is selected from among orthogonal cover codes mapped to different ACK/NACK channel indexes in two different slots of the subframe.

9. The apparatus of claim 6, wherein ACK/NACK channel indexes being usable for transmitting the ACK/NACK information in the first slot of the subframe are randomly changed in a second slot of the subframe.

10. The apparatus of claim 6, wherein the ACK/NACK channel indexes allocated to [+1 +1 +1 +1] in the first slot are allocated to at least two of [+1 +1 +1 +1], [+1 −1 +1 −1], and [+1 −1 −1 +1] in a second slot of the subframe.

11. A method for receiving acknowledgment/negative acknowledgment (ACK/NACK) information at a base station (BS) in a wireless communication system, the method comprising:
 transmitting data to a user equipment (UE);
 determining a combination of a cyclic shift value and an orthogonal cover code for ACK/NACK transmission; and
 receiving ACK/NACK information for the transmitted data using the determined cyclic shift value and orthogonal cover code,
 wherein the orthogonal cover code is selected from a group consisting of a first orthogonal cover code [+1 +1 +1 +1], a second orthogonal cover code [+1 −1 +1 −1], and a third orthogonal cover code [+1 −1 −1 +1],
 wherein a first set, a second set, and a third set of ACK/NACK channel indexes being usable for transmitting the ACK/NACK information are sequentially allocated to [+1 +1 +1 +1], [+1 −1 +1 −1], and [+1 −1 −1 +1] in a first slot of a subframe, the first set comprising lower indexes of ACK/NACK channels and the third set comprising upper indexes of ACK/NACK channels, and
 wherein the ACK/NACK channel indexes in a set corresponding to each of [+1 +1 +1 +1], [+1 −1 +1 −1], and [+1 −1 −1 +1] are allocated in an ascending order of a plurality of cyclic shift values.

12. The method of claim 11, wherein different combinations each comprising a cyclic shift value and an orthogonal cover code are used for ACK/NACK transmission in the two different slots of the subframe, and
 wherein different frequency bands are used for ACK/NACK transmission in two different slots of the subframe based on an ACK/NACK channel index corresponding to the determined cyclic shift value and orthogonal cover code.

13. The method of claim 11, wherein the orthogonal cover code is selected among orthogonal cover codes mapped to different ACK/NACK channel indexes in two different slots of the subframe.

14. The method of claim 11, wherein ACK/NACK channel indexes used for transmitting the ACK/NACK information in the first slot of the subframe are randomly changed in a second slot of the subframe.

15. The method of claim 11, wherein the ACK/NACK channel indexes allocated to [+1 +1 +1 +1] in the first slot are allocated to at least two of [+1 +1 +1 +1], [+1 −1 +1 −1], and [+1 −1 −1 +1] in a second slot of the subframe.

16. A method for transmitting acknowledgment/negative acknowledgment (ACK/NACK) information at a user equipment (UE) in a wireless communication system, the method comprising:
 receiving data from a base station (BS);
 acquiring a combination of a cyclic shift value and an orthogonal cover code for ACK/NACK transmission; and
 transmitting ACK/NACK information for the received data using the acquired cyclic shift value and orthogonal cover code, wherein the orthogonal cover code is selected from a group consisting of [+1 +1 +1 +1], [+1 −1 +1 −1], and [+1 −1 −1 +1], wherein a first set, a second set, and a third set of ACK/NACK channel indexes being usable for transmitting the ACK/NACK information are sequentially allocated to [+1 +1 +1 +1], [+1 −1 +1 −1], and [+1 −1 −1 +1] in a first slot of a subframe, the first set comprising lower indexes of ACK/NACK channels and the third set comprising upper indexes of ACK/NACK channels, and wherein the ACK/NACK channel indexes in a set corresponding to each of [+1 +1 +1 +1], [+1 −1 +1 −1], and [+1 −1 −1 +1] are allocated in an ascending order of a plurality of cyclic shift values.

17. The method of claim 16, wherein different combinations each comprising a cyclic shift value and an orthogonal cover code are used for ACK/NACK transmission in two different slots of the subframe, and wherein different frequency bands are used for ACK/NACK transmission in the two different slots of the subframe based on an ACK/NACK channel index corresponding to the determined cyclic shift value and orthogonal cover code.

18. The method of claim 16, wherein the orthogonal cover code is selected from among orthogonal cover codes mapped to different ACK/NACK channel indexes in two different slots of the subframe.

19. The method of claim 16, wherein ACK/NACK channel indexes being usable for transmitting the ACK/NACK information in the first slot of the subframe are randomly changed in a second slot of the subframe.

20. The method of claim 16, wherein the ACK/NACK channel indexes allocated to [+1 +1 +1 +1] in the first slot are allocated to at least two of [+1 +1 +1 +1], [+1 −1 +1 −1], and [+1 −1 −1 +1] in a second slot of the subframe.

* * * * *